United States Patent [19]

Ronald

[11] 4,024,922

[45] May 24, 1977

[54] BLADE ATTACHMENT WITH BUILT-IN AIR VENT

[75] Inventor: Richard E. Ronald, St. Thomas, Canada

[73] Assignee: Clark Equipment Company, Buchanan, Mich.

[22] Filed: June 20, 1975

[21] Appl. No.: 588,927

[52] U.S. Cl. .................................. 172/801; 172/767
[51] Int. Cl.² ............................................. E02F 3/76
[58] Field of Search .......... 172/755, 756, 767, 801, 172/802, 803, 804, 805, 806, 807, 808, 809; 37/2 P; 214/92, 523

[56] References Cited

UNITED STATES PATENTS

| 1,736,352 | 11/1929 | Mahoney et al. ............... 172/767 X |
| 2,633,164 | 3/1953 | Kissner et al. .................... 37/2 P X |
| 2,722,758 | 11/1955 | Loftin et al. .......................... 37/2 P |
| 2,740,213 | 4/1956 | Barrett .............................. 172/809 |
| 3,090,138 | 5/1963 | Dudley ................................ 37/2 P |
| 3,424,251 | 1/1969 | Bouley .............................. 172/801 |

OTHER PUBLICATIONS

Photograph from Atlanta show, June 7, 1975.

*Primary Examiner*—Richard T. Stouffer
*Attorney, Agent, or Firm*—Harry G. Thibault

[57] ABSTRACT

A blade attachment having a built-in air vent or duct to permit the flow of air to or from the engine space through the blade when in the raised position.

1 Claim, 3 Drawing Figures

BLADE ATTACHMENT WITH BUILT-IN AIR VENT

BACKGROUND OF THE INVENTION

1. Field of the Invention

This invention pertains to off-highway tractor vehicles provided with a blade attachment which can be raised or lowered at the front of the vehicle.

2. Description of the prior Art

A skidder uses a blade similar to a dozer blade having an elongated, continuous concave surface called a decking blade for arranging logs on the ground.

Another type of blade is used in site preparation work where the merchantable timber has been removed and it is necessary to doze over the smaller trees and brush to prepare the site for new growth.

In clearing work it is necessary that the blade remain in an elevated position for extended periods. Since the engine draws cooling air in at the side and expels it through the radiator at the front, if the decking blade is used for clearing, it is soon found that with the blade in the raised position it obstructs air flow to the point that the engine becomes overheated.

On the other hand, a clearing blade is generally open in construction so as not to restrict air flow. However changing from the conventional decking blade to a clearing blade is a time-consuming problem.

SUMMARY OF THE INVENTION

A blade attachment for tractor vehicles comprising an elongated continuous blade having parallel arms at the outer ends extending rearwardly for pivotal mounting to the vehicle. The tractor vehicle is powered by an engine mounted in an engine space at the front. A pair of hydraulic cylinders, or some other device, raises and lowers the blade. A fan in the engine space is driven by the engine for providing a forced circulaton of air through the radiator at the front.

In accordance with the invention, an air vent or duct is built-in the blade occupying an area of the blade surface which would otherwise be directly in the path of air flow. This area is of a size so as not to obstruct the flow of air for engine cooling purposes with the blade in the raised position for an extended period of time.

DESCRIPTON OF THE DRAWINGS

FIG. 1 is a front elevational view showing the blade attachment in the lowered position, FIG. 2 is a front elevational view showing the blade attachment in the raised position, and FIG. 3 is a fragmentary side view with the front of the tractor partially broken away to show the engine fan and depicting the air flow through the blade vent with the blade in the raised position.

DETAILED DESCRIPTION OF THE PREFERRED EMBODIMENT OF THE INVENTION

Figure 1:
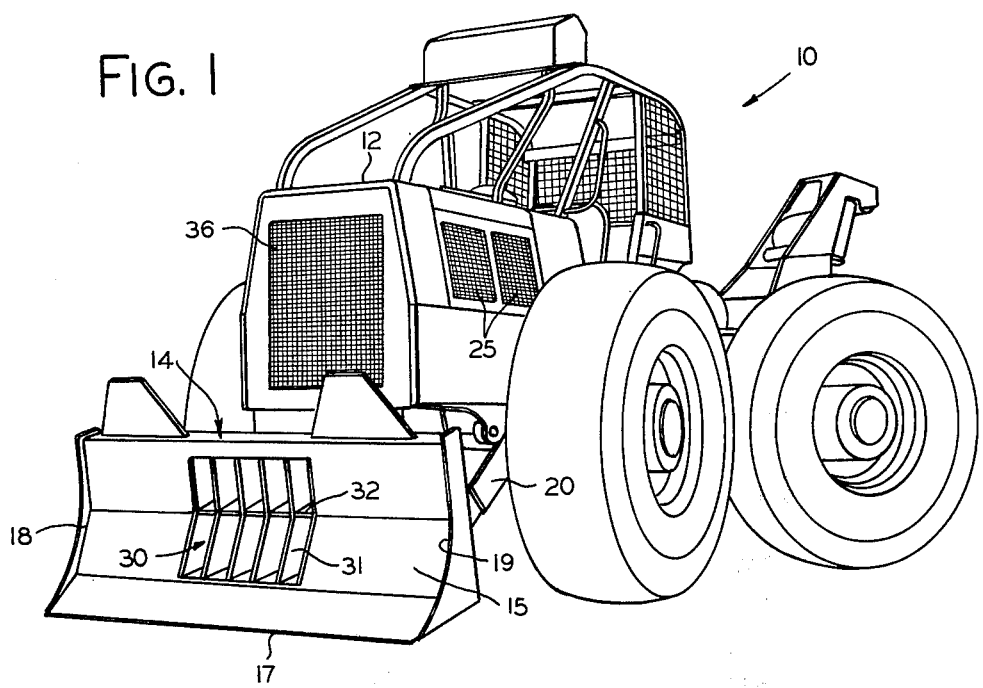
Figure 2:
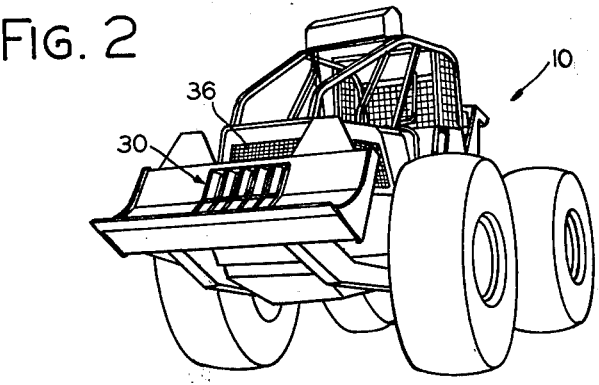

FIG. 1 shows a skidder 10 having an engine space 12 at the front. While the description herein will be with respect to a skidder vehicle employing a decking blade 14 it will be appreciated that the invention has application to other types of vehicles where a blade attachment is used such as a dozer. In the application of a skidder, the decking blade 14 has a concave front surface 15 which is elongated transversely having a bottom horizontal edge 17 and vertical side edges 18, 19. The blade 14 is designed primarily for decking logs i.e., lifting, pushing and sorting felled trees or logs and arranging them in rows or decks. At the opposite ends are arms 20 extending rearwardly which pivotally mount the blade to the skidder frame permitting it to be raised and lowered. A pair of hydraulic cylinders not shown, will be operated for raising and lowering the arms 20. In the raised position, the blade 14 extends across the front of the engine space 12 as shown in FIG. 2. As partly shown in FIG. 3, the engine space 12, in addition to housing an engine 21, has a radiator 22. Behind the radiator is a fan 23 driven by the engine for providing forced air flow through the radiator as depicted by arrows and dot-dash lines 24. With a skidder, the fan is a pusher fan. That is the air is pulled in through a grille 25 in the side of the engine cover and exhausted forwardly through the radiator.

Figure 3:
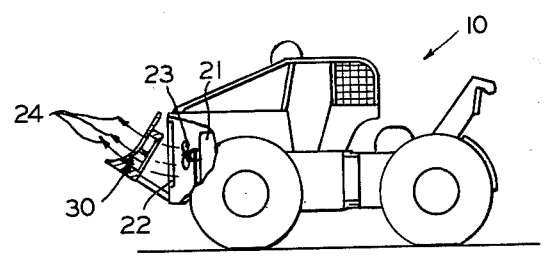

In the usual case the decking blade 14 will be in the lowered position as shown in FIG. 1. In that position it may be used in the normal manner for decking logs. In site preparation work, however, the decking blade 14 is in the elevated position (FIGS. 2–3) for substantial periods of time. According to the invention, an air vent or duct 30 extends from one side to the other of the blade 14 permitting air to flow through the blade in the elevated position as depicted in FIG. 3. The air duct 30 is of a size to handle the exhaust of the fan 23 without appreciably restricting free air flow. A rectangular grille of ribs 31 joined by horizontal web 32 prevent the intrusion of large obstacles such as branches or the like which might otherwise dent or damage the guard plate 36 covering the radiator. The grille also provides structural support for the blade.

Of course, for a dozer blade where the primary function is pushing dirt, the air duct might be provided with a louvered grille. This could be operated hydraulically or mechanically for opening and closing the duct. Alternatively, there could be a sheet metal sliding wall movable laterally to close the duct when a continuous blade surface was required and slidable to one side to open the duct when the blade is elevated for longer periods.

While one preferred embodiment of my invention has been disclosed it will be understood that the description is for purposes of illustration only and that various modifications and changes may be made without departing from the nature of the inventon which is defined in the appended claims.

I claim:

1. For a tractor having an engine space at the front thereof and a fan in the engine space providing a forced flow of air through the front of the engine space, a blade attachment comprising an elongated dual-position blade mountable in a first or lowered position for stacking work wherein the blade is disposed at ground level and in a second or elevated position for clearing work wherein the blade is disposed in an elevated position substantially overlying the forward end of the engine space in blocking relation to air flow through the space, the blade comprising a front face, which has a substantially flat upper edge and a lower edge and is continuous therebetween over most of the width of said face, said front face further being continuous inwardly from the side edges thereof to generally the center thereof, said blade face having an air vent opening therethrough, which extends downwardly below the top edge of said continuous front face and is positioned in the center of the blade substantially midway between said side edges, said air vent opening being disposed substantially in the path of engine air flow to prevent overheating of the engine when the blade is in an elevated position, support structure for the blade disposed behind said front face, the support structure including parallel arms at the outer ends of the blade extending rearwardly and adapted for pivotal mounting at the trailing ends to the tractor, and means for raising the blade attachment to the elevated position into the path of air flow for the engine, the air vent opening having a plurality of spaced vertical ribs mounted therein, said ribs joined by a horizontal web to form a grille.

* * * * *